No. 735,735. PATENTED AUG. 11, 1903.
S. FEUST & B. L. WRIGHT.
AIR BRAKE CONNECTION.
APPLICATION FILED JULY 29, 1902.
NO MODEL. 2 SHEETS—SHEET 1.
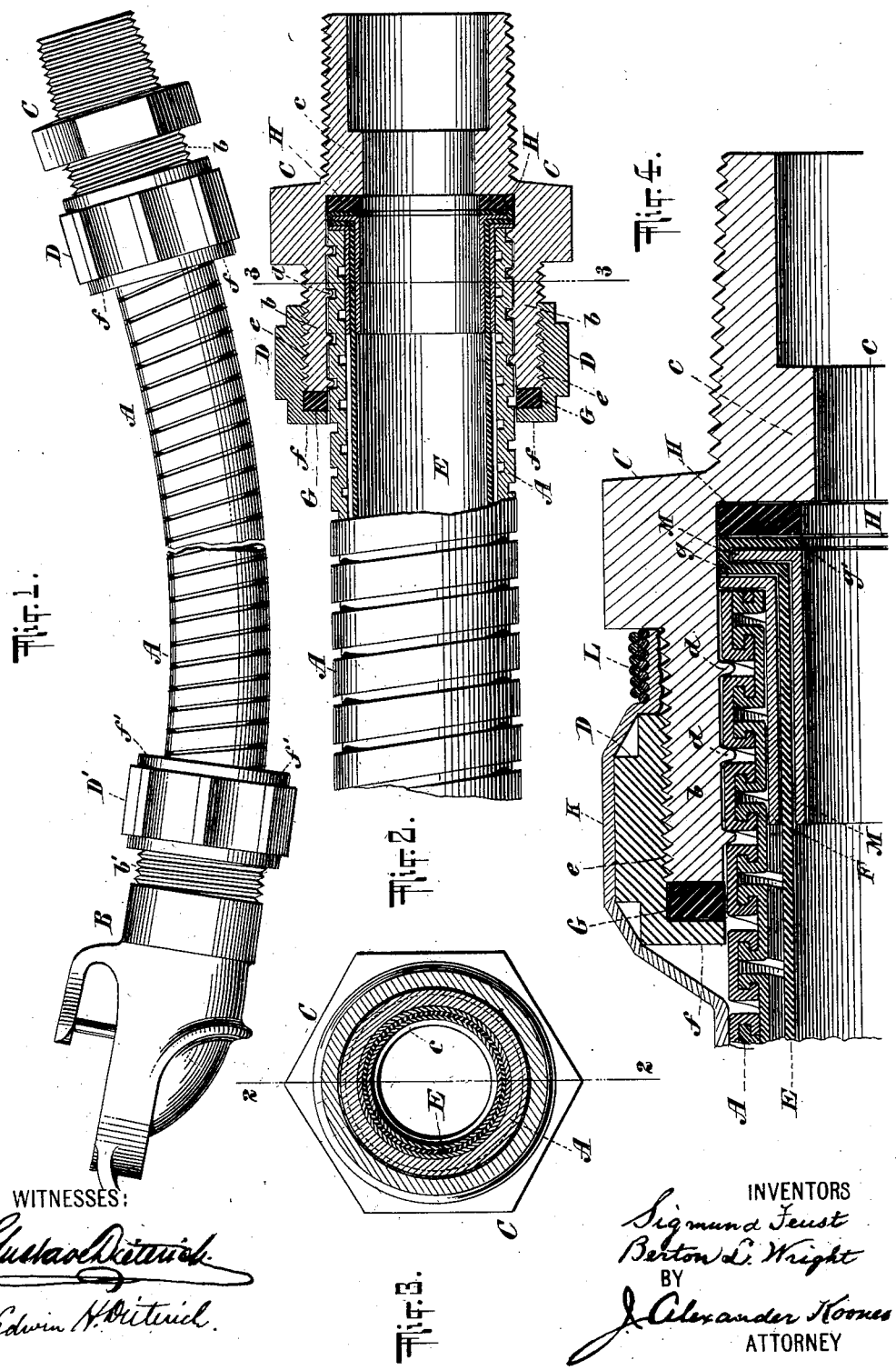

No. 735,735. PATENTED AUG. 11, 1903.
S. FEUST & B. L. WRIGHT.
AIR BRAKE CONNECTION.
APPLICATION FILED JULY 29, 1902.
NO MODEL. 2 SHEETS—SHEET 2.
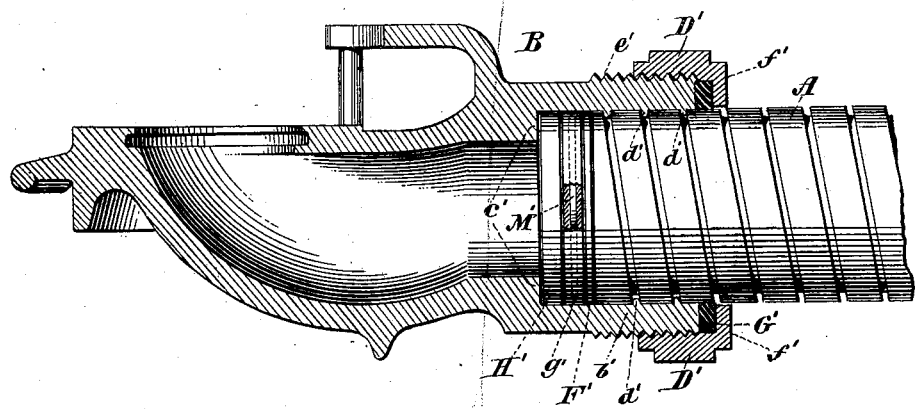
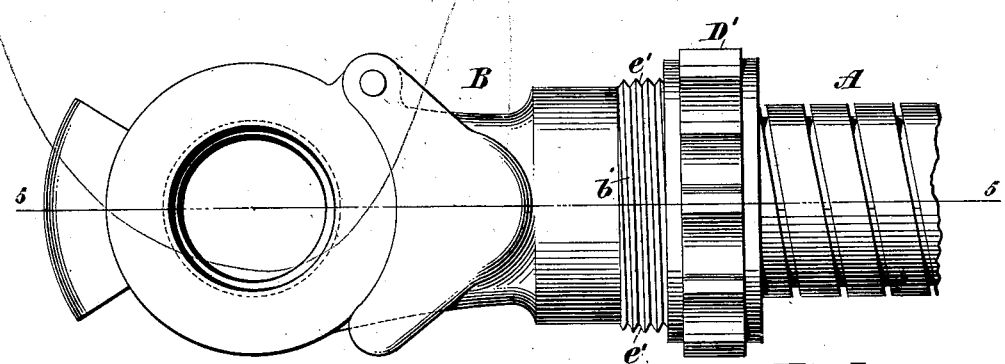
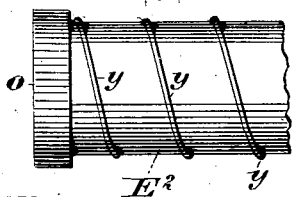
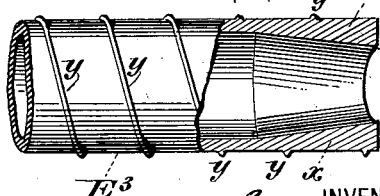
WITNESSES:
Gustave Dittrich
Edwin H. Dittrich
INVENTORS
Sigmund Feust
Berton L. Wright
BY
J. Alexander Kovnes
ATTORNEY No. 735,735. Patented August 11, 1903.

UNITED STATES PATENT OFFICE.

SIGMUND FEUST AND BERTON L. WRIGHT, OF NEW YORK, N. Y.

AIR-BRAKE CONNECTION.

SPECIFICATION forming part of Letters Patent No. 735,735, dated August 11, 1903.

Application filed July 29, 1902. Serial No. 117,479. (No model.)

*To all whom it may concern:*

Be it known that we, SIGMUND FEUST and BERTON L. WRIGHT, of the borough of the Bronx, in the city of New York, county of New York, and State of New York, citizens of the United States, have invented new and useful Improvements in Air-Brake Connections, of which the following is a full, clear, and exact description.

Our invention relates to the flexible hose connections which are used between locomotives and cars of railroad-trains for the purpose of connecting or coupling the air-pipes of a locomotive to the air-pipes of the car following it and the air-pipes of one car of a train to the air-pipes of the following car, so as to unite quickly such pipes into one continuous air-braking system for the whole train when the locomotive is attached or the train made up and to part quickly such connections when the cars are to be uncoupled; and our improvements relate more particularly to the means of effecting the air-retaining capacity of such connections at the places where the hose and couplings are joined, as well as in the walls of the hose or tubing composing the connection along its entire length.

The object of our invention is to devise such a form of construction for air-brake connections as will enable flexible tubing made wholly or chiefly of some material other than rubber to be used successfully in place of the thick rubber hose now almost generally used in the construction of such connections. Experience has demonstrated that such rubber hose is unsatisfactory and unreliable in actual use, and in the opinion of practical railroad men the use of a flexible tubing wherein metal or some other equally durable material is the principal factor in place of such rubber hose would be a desirable improvement if the difficulties of joining such tubing with the couplings could be successfully overcome and such joints were made less subject to disruption or leakage. As metal tubing spirally wound—one of the best substitutes for rubber hose in the construction of the connections referred to—is usually packed with strips of asbestos or some textile fabric placed within its folds, the heat necessarily employed in soldering or brazing the couplings to the tubing is apt to disintegrate or destroy the packing, and thereby leave vents in the latter, and the mechanical devices heretofore suggested for the purpose of effecting such joints without soldering or brazing do not prevent the air from finding a passage into the extremities of the folds of the tubing inside of the couplings and thence through such folds and their interstices out of the connection, rendering it non-serviceable. To overcome these difficulties, we have designed the connection and the specially-constructed parts thereof shown in the accompanying drawings and hereinafter described.

Referring to the drawings, Figure 1 is a side view of our improved flexible pipe connection broken in the center. Fig. 2 is a central longitudinal section on the line 2 2 of Fig. 3. Fig. 3 is a cross-section on the line 3 3 of Fig. 2. Fig. 4 is an enlarged detailed section of the connection at the union of the tubing A with the air-brake pipe-coupling C and the nut D. Fig. 5 is a longitudinal section of the air-brake coupling-head as modified by our improvements therein. Fig. 6 is a plan view of the same air-brake coupling-head shown in Fig. 5. Fig. 7 is a view of one end of the rubber hose or lining $E^2$, showing a flange and exterior spiral screw-thread; and Fig. 8 is a view of one end of a rubber hose $E^3$, showing in section a gradually-enlarged thickness $x$ at the end.

In the different figures the same letters indicate the same parts.

In the drawings, A is the spirally-wound and double-seamed metal tubing.

B is the air-brake coupling-head, and C is the air-brake pipe-coupling.

$b$ and $b'$, respectively, indicate the annular projections or nipples of C and B; $d$ and $d'$, the inside screw-threads, and $e$ and $e'$ the outside screw-threads, of such nipples.

D and D' are metal nuts, of which $f$ and $f'$ are the respective flanges.

E is a soft-rubber tubing serving as an interior air-tight coating for the metal tubing as well as a sealing over the extremities of such metal tubing.

$g$ and $g'$ indicate the folds of the soft-rubber tubing.

F is a flanged metal ferrule, and M is also a flanged metal ferrule which fits within the former when covered with the rubber tubing.

G is a rubber gasket sufficiently soft to allow it to spread radially when squeezed by the flange of the nut D. G' is a similar gasket.

H and H' are washers, also of soft rubber, inserted in the couplings.

K is an exterior covering, of rubber cloth or other suitable material.

L is the cord or wire binding the rubber cloth to the connection and shown in section in Fig. 4.

M and M' are flanged metal ferrules, $o$ flange, and $y\ y$ screw-threads molded on rubber hose $E^2$, (shown in Fig. 7,) and $x$ enlarged thickness at end of rubber hose $E^3$. (Shown in Fig. 8.)

The metal tubing which we prefer to use is made double-seamed and spirally wound in accordance with the invention of E. Levavasseur as secured by United States Letters Patent No. 330,910 on November 24, 1885, although other flexible metal tubing may be used. We also prefer to have the tubing packed between its overlapping folds with asbestos tape or other suitable material, but do not insist upon any packing. For the tubing E any suitable material other than rubber may be used.

The coupling-head B and the air-pipe coupling C are respectively of usual construction, except as to the part or nipple to which the tubing is connected, and such part in each coupling is of like construction.

Referring to the air-pipe coupling C, such part is furnished inside with an annular projection $c$, having a flat bearing-surface upon its side toward the mouth of the nipple, and is interiorly from such projection to its mouth threaded with a spiral thread which will fit into and engage with the spiral spaces on the outside of and between the folds of the tube A, which spaces on account of the tubing preferably used being constructed of strips of metal are sort of slots running parallel to each other and spirally around the tube from end to end. Exteriorly this nipple or joining part of the coupling is furnished with a male screw-thread to correspond with the female thread in the nut D. The nut D is provided with a flange $f$, the diameter of whose bore is such as to allow the metal tubing A to slide through it and the purpose of which is to hold the gasket G in place and squeeze it against the exterior surface of the metal tubing A. This nut may be constructed perfectly round and not, as shown in the drawings, with polygonal perimeters, the round construction being preferable, as the nuts can then be turned only by specially-constructed wrenches and not by the ordinary monkey-wrenches used by the train-hands, and so less liable to displacement.

To construct one of our improved connections in the best manner, we take a piece of flexible metal tubing A. Into this we insert at one end the metal ferrule F and at the other end a similar metal ferrule F'. Through these ferrules and the metal tubing we draw the rubber tubing E, permitting each of its ends to project beyond the ferrules F and F' a distance sufficient to allow the circumference of its edges, where it is gripped by the ferrule-flanges, to correspond with the circumference of the bore of the line connection. Then the ferrule M is inserted within the rubber tubing at one end, and at the other end a like ferrule M' is similarly inserted. The projecting portions of the rubber tubing are squeezed between the flanges of the two ferrules F and M and F' and M' at each end of the tubing and then turned up and held in position against the outside bearing-surfaces of the flanges of the inner ferrules M and M', respectively, by the rubber gasket H in the air-pipe coupling and the gasket H' in the air-brake coupling-head.

The air-brake coupling-head B and the air-pipe coupling C are secured and fastened to the tubing A in a similar manner, and a description of the method of securing and fastening the one will serve to explain the other. One end of the metal tubing, prepared as stated, and the washer or gasket H (care being taken that such gasket holds in position the free end of the rubber tubing E) are inserted into the air-pipe coupling C, and the metal tubing A is screwed in until the rubber gasket is firmly seated upon the bearing-surface of the annular projection $c$ inside of such coupling. The nut D is then turned until the surface of the bore of the gasket G expanding clutches the metal tubing A and tightly holds the same. This being done, the other end of the tubing is packed, secured, and fastened to the air-brake coupling-head B in like manner. The connection may, if desired, be then covered with rubber cloth, canvas, or other suitable material K and attached by means of twine or wire L, as shown in Fig. 4. The gaskets H and H', the ferrules F and F' or M and M', or all of them, may be omitted. The ends or folds of the rubber tubing may be secured in place against the flanges of the ferrules F and F' and M and M' or the flanges of whichever of such ferrules may be used, or in case such ferrules are omitted against the extremities of the metal tubing and the rubber lining's own inner folds. The gaskets H and H' also may be cemented to the outer folds of the soft-rubber lining E, and the ferrules F and M and F' and M' may be secured in position in the metal tubing and rubber lining by cement, solder, or both, or by screw-threading. The rubber tubing E may be furnished at its extremities with flanges of the same material, as $o$, (shown in Fig. 7,) or its thickness may be gradually increased toward such extremities, as $x$, (shown in Fig. 8,) to supply the place of the folds $g$ and $g'$, and the rubber hose E may or may not be furnished on the outside with screw-threads molded thereon to fit in the spaces or spiral slots on the inside of the metal tubing, in which case only one ferrule at each end may be used or none at all.

As thus constructed our connection may be used as a substitute for the rubber-hose connections now almost generally employed and in the customary manner.

We do not claim as new the rubber tubing used only as a lining for the metal tubing; nor do we claim as new the rubber-cloth covering used in connection with the metal tubing without any interior coating.

We are aware that attempts have been previously made to make air-brake connections with flexible metallic tubing interiorly coated or lined with rubber or other material and united with the couplings by mechanical means without the use of soldering or brazing; but we believe ourselves to be the first to utilize the rubber lining as a means of preventing the passage of the air through the ends of the folds of the metal tubing, as well as through the surface of the same, and also the first to fasten the metal tubing and coupling together by the devices and in the manner hereinbefore described and shown.

We claim—

1. In an air-brake connection, the spirally-wound double-seamed metal tubing A, the soft-rubber tubular lining E therein, combined with the coupling-head B at one end and the air-pipe coupling C at the other end, these couplings being of usual construction except the nipple of each is exteriorly screw-threaded and interiorly furnished with an annular flat bearing-surface projection c and screw-threaded therefrom to the mouth with threads to engage the outside slots between the folds of the metal tubing, the flanged nuts D and D' and the gaskets G and G', the flanges of the former, when such nuts are screwed on, compress the gaskets G and G' against the ends of the nipples and radially against the metal tubing thereby aiding its retention in place when screwed into the couplings B and C, the flanged ferrules F and M and F' and M' and the gaskets H and H', which respectively with the folded ends of the rubber lining E form the packing between the extremities of the metal tubing and the flat bearing-surfaces of the interior projections of the couplings, all constructed and combined as hereinbefore described and shown.

2. In an air-brake connection, the spirally-wound double-seamed metal tubing A, the soft-rubber tubular lining E therein, combined with the coupling-head B at one end and the air-pipe coupling C at the other end, these couplings being of usual construction except the nipple of each is exteriorly screw-threaded and interiorly furnished with an annular flat bearing-surface projection c and screw-threaded therefrom to the mouth with threads to engage the outside slots between the folds of the metal tubing, the flanged nuts D and D' and the gaskets G and G', the flanges of the former, when such nuts are screwed on, compress the gaskets G and G' against the ends of the nipples and radially against the metal tubing, thereby aiding its retention in place, when screwed into the couplings B and C, the flanged ferrules F and F' and the gaskets H and H', which respectively with the folded ends of the rubber lining E form the packing between the extremities of the metal tubing and the flat bearing-surfaces of the interior projections of the couplings all constructed and combined as hereinbefore described and shown.

3. In an air-brake connection the spirally-wound double-seamed metal tubing A the soft-rubber tubular lining E therein, combined with the coupling-head B at one end and the air-pipe coupling C at the other end, these couplings being of usual construction except the nipple of each is exteriorly screw-threaded and interiorly furnished with an annular flat bearing-surface projection c and screw-threaded therefrom to the mouth with threads to engage the outside slots between the folds of the metal tubing, the flanged nuts D and D' and the gaskets G and G', the flanges of the former when such nuts are screwed on compress the gaskets G and G' against the ends of the nipples and radially against the metal tubing thereby aiding its retention in place, when screwed into the couplings B and C, and the gaskets H and H' which respectively with the folded ends of the rubber lining E, form the packing between the extremities of the metal tubing and the flat bearing-surfaces of the interior projections of the couplings all constructed and combined as hereinbefore described and shown.

4. In an air-brake connection the spirally-wound double-seamed metal tubing A, the soft-rubber tubular lining E therein, combined with the coupling-head B at one end and the air-pipe coupling C at the other end, these couplings being of usual construction except the nipple of each is exteriorly screw-threaded and interiorly furnished with an annular flat bearing-surface projection c and screw-threaded therefrom to the mouth with threads to engage the outside slots between the folds of the metal tubing, and the flanged nuts D and D' and the gaskets G and G', the flanges of the former when such nuts are screwed on, compress the gaskets G and G' against the ends of the nipples and radially against the metal tubing, thereby aiding its retention in place, when screwed into the couplings B and C, the folded ends of the rubber lining E form the packing between the extremities of the metal tubing and the flat bearing-surfaces of the interior projections of the couplings all constructed and combined as hereinbefore described and shown.

5. In an air-brake connection the spirally-wound double-seamed metal tubing A, the soft-rubber tubular lining E therein, combined with the coupling-head B at one end and the air-pipe coupling C at the other end, these couplings being of usual construction except the nipple of each is exteriorly screw-threaded and interiorly furnished with an annular flat bearing-surface projection $c$ and screw-threaded therefrom to the mouth with threads to engage the outside slots between the folds of the metal tubing, the flanged nuts D and D' and the gaskets G and G', the flanges of the former, when such nuts are screwed on, compress the gaskets G and G' against the ends of the nipples and radially against the metal tubing, thereby aiding its retention in place, when screwed into the couplings B and C, the flanged ferrules F and M and F' and M' which respectively with the folded ends of the rubber lining E, form the packing between the extremities of the metal tubing and the flat bearing-surfaces of the interior projections of the couplings, all constructed and combined as hereinbefore described and shown.

6. In an air-brake connection the spirally-wound double-seamed metal tubing A, the soft-rubber tubular lining E therein, combined with the coupling-head B at one end and the air-pipe coupling C at the other end, these couplings being of usual construction except the nipple of each is exteriorly screw-threaded and interiorly furnished with an annular flat bearing-surface projection $c$ and screw-threaded therefrom to the mouth with threads to engage the outside slots between the folds of the metal tubing, the flanged nuts D and D' and the gaskets G and G', the flanges of the former, when such nuts are screwed on, compress the gaskets G and G' against the ends of the nipples and radially against the metal tubing, thereby aiding its retention in place, when screwed into the couplings B and C, the flanged ferrules F and F', which respectively with the folded ends of the rubber lining E form the packing between the extremities of the metal tubing and the flat bearing-surfaces of the interior projections of the couplings all constructed and combined as hereinbefore described and shown.

7. In an air-brake connection the spirally-wound double-seamed metal tubing A, the soft-rubber tubular lining E therein, combined with the coupling-head B at one end and the air-pipe coupling C at the other end, these couplings being of usual construction except the nipple of each is exteriorly screw-threaded and interiorly furnished with an annular flat bearing-surface projection $c$ and screw-threaded therefrom to the mouth with threads to engage the outside slots between the folds of the metal tubing, the flanged nuts D and D' and the gaskets G and G', the flanges of the former when such nuts are screwed on, compress the gaskets G and G' against the ends of the nipples and radially against the metal tubing, thereby aiding its retention in place, when screwed into the couplings B and C, the flanged ferrules M and M', which respectively with the folded ends of the rubber lining E form the packing between the extremities of the metal tubing and the flat bearing-surfaces of the interior projections of the couplings, all constructed and combined as hereinbefore described and shown.

8. In an air-brake connection the spirally-wound double-seamed metal tubing A, the soft-rubber tubular lining E therein, combined with the coupling-head B at one end and the air-pipe coupling C at the other end, these couplings being of usual construction except the nipple of each is exteriorly screw-threaded and interiorly furnished with an annular flat bearing-surface projection $c$ and screw-threaded therefrom to the mouth with threads to engage the outside slots between the folds of the metal tubing, the flanged nuts D and D' and the gaskets G and G', the flanges of the former, when such nuts are screwed on, compress the gaskets G and G' against the ends of the nipples and radially against the metal tubing, thereby aiding its retention in place, when screwed into the couplings B and C, the flanged ferrules M and M' and the gaskets H and H' which respectively, with the folded ends of the rubber lining E, form the packing between the extremities of the metal tubing and the flat bearing-surfaces of the interior projections of the couplings, all constructed and combined as hereinbefore described and shown.

9. The air-tight pipe-joint for spirally-wound metal tubing, consisting of a coupling-head B of usual construction, with one of its nipples lengthened and furnished interiorly with an annular projection $c'$ and screw-threaded therefrom to the mouth with threads to engage the slots between the folds on the outside of tubing A and exteriorly with screw-threads, the flanged nut D' screwed upon the nipple and its flange designed to force the gasket G' against the end of the nipple and squeeze such gasket radially against the outer surface of tubing A and thereby aid the retention of the tubing within the coupling, the ferrules F' and M' and the gasket H'—which gasket, with the flanges of such ferrules and the folds of the lining E, are for the purpose of forming a packing between the end of the metal tubing and the flat bearing-surface of the projection $c'$, all combined and constructed as hereinbefore described and shown.

10. The air-tight pipe-joint for spirally-wound metal tubing, consisting of a coupling-head B of usual construction, with one of its nipples lengthened and furnished interiorly with an annular projection $c'$, and screw-threaded therefrom to the mouth with threads to engage the slots between the folds on the outside of tubing A and exteriorly with screw-threads, the flanged nut D' screwed upon the nipple and its flange designed to force the gasket G' against the end of the nipple and squeeze such gasket radially against the outer surface of tubing A and thereby aid the retention of the tubing within the coupling, the ferrule F' and the gasket H', which gasket and the flange of such ferrule and the folds of the lining E are for the purpose of forming a packing between the end of the tubing and the flat bearing-surface of the projection c', all combined and constructed as hereinbefore described and shown.

11. The air-tight pipe-joint for spirally-wound metal tubing, consisting of a coupling-head B of usual construction, with one of its nipples lengthened and furnished interiorly with an annular projection c' and screw-threaded therefrom to the mouth with threads to engage the slots between the folds on the outside of tubing A and exteriorly with screw-threads, the flanged nut D' screwed upon the nipple and its flange designed for forcing a gasket G' against the end of the nipple and squeezing such gasket radially against the outer surface of tubing A and thereby aiding the retention of the tubing within the coupling, the ferrule M' and the gasket H', which, with the flange of such ferrule and the folds of the lining E, are for the purpose of forming a packing between the end of the tubing and the flat bearing-surface of the projection c', all combined and constructed as hereinbefore described and shown.

12. The air-tight pipe-joint for spirally-wound metal tubing, consisting of a coupling-head B of usual construction, with one of its nipples lengthened and furnished interiorly with an annular projection c' and screw-threaded therefrom to the mouth with threads to engage the slots between the folds on the outside of tubing A and exteriorly with screw-threads, the flanged nut D' screwed upon the nipple and its flange designed for forcing a gasket G' against the end of the nipple and squeezing such gasket radially against the outer surface of the tubing A and thereby aiding the retention of the tubing within the coupling, the ferrules F' and M', the flanges of which and the folds of the lining E are intended for a packing between the end of the tubing and the flat bearing-surface of the projection c', all combined and constructed as hereinbefore described and shown.

13. The air-tight pipe-joint for spirally-wound metal tubing, consisting of a coupling-head B of usual construction, with one of its nipples lengthened and furnished interiorly with an annular projection c' and screw-threaded therefrom to the mouth with threads to engage the slots between the folds on the outside of tubing A and exteriorly with screw-threads, the nut D' screwed upon the nipple, the flange of such nut being designed for forcing the gasket G' against the end of the nipple and squeezing such gasket radially against the outer surface of tubing A and thereby aiding its retention within the coupling, and the gasket H', which with the folds of the lining E are intended for a packing between the end of the tubing and the flat bearing-surface of the projection c', all combined and constructed as hereinbefore described and shown.

14. The air-tight pipe-joint for spirally-wound metal tubing, consisting of a coupling-head B of usual construction, with one of its nipples lengthened and furnished interiorly with an annular projection c' and screw-threaded therefrom to the mouth with threads to engage the slots between the folds on the outside of tubing A and exteriorly with screw-threads, the nut D' screwed upon the nipple, the flange of such nut being designed for forcing a gasket G' against the end of the nipple and squeezing such gasket radially against the outer surface of tubing A and thereby aiding the retention of the tubing within the coupling, the extremities of the lining E being folded for the purpose of forming a packing between the end of the tubing and the flat bearing-surface of the projection c', all combined and constructed as hereinbefore described and shown.

15. The air-tight pipe-joint for spirally-wound metal tubing, consisting of a coupling-head B of usual construction, with one of its nipples lengthened and furnished interiorly with an annular projection c' and screw-threaded therefrom to the mouth with threads to engage the slots between the folds on the outside of tubing A and exteriorly with screw-threads, the nut D' screwed upon the nipple and the flange of such nut designed for forcing a gasket G' against the end of the nipple and squeezing such gasket radially against the outer surface of tubing A, and thereby aiding the retention of the tubing within the coupling, the ferrule F' and the gasket H', the folds of the lining E, the flange of such ferrule F' and the gasket H' being designed for a packing between the end of the tubing and the flat bearing-surface of the projection c', all combined and constructed as hereinbefore described and shown.

16. The air-tight pipe-joint for spirally-wound metal tubing, consisting of a coupling-head B of usual construction, with one of its nipples lengthened and furnished interiorly with an annular projection c' and screw-threaded therefrom to the mouth with threads to engage the slots between the folds on the outside of tubing A, and exteriorly with screw-threads, the nut D' screwed upon the nipple and the flange of such nut being intended for forcing the gasket G' against the end of the nipple and squeezing such gasket radially against the outer surface of tubing A and thereby aiding the retention of the tubing within the coupling, the ferrule M' and the gasket H', which gasket and the flange of such ferrule, together with the folds of the lining E, are intended for a packing between the end of the tubing and the flat bearing-surface of the projection c', all combined and constructed as hereinbefore described and shown.

17. The air-brake coupling-head B having a lengthened nipple $b'$, which is prepared for the reception of the end of a double-seamed spirally-wound metal tube by being furnished with interior screw-threads to engage in the slots of the metal tube and with an inside annular projection $c'$ to retain between its outer bearing-surface and the end of the metal tube a gasket or other packing, and the nipple $b'$ being furnished also exteriorly with screw-threads upon which a flanged nut may be screwed to squeeze a rubber gasket H' and fasten the coupling upon the tubing, all constructed as hereinbefore set forth.

18. The air-brake pipe-coupling C, having a screw-threaded nipple of usual construction at one end and at the other end a lengthened connecting-nipple $b$, which is prepared for the reception of the end of a double-seamed spirally-wound metal tube and with an inside annular projection $c$ to retain between its outer bearing-surface and the end of the tube a gasket or other packing, the nipple $b$ being furnished also exteriorly with screw-threads upon which a flanged nut may be screwed against a gasket to retain the tube within the coupling, all constructed as hereinbefore set forth.

19. The air-brake connection-hose consisting of the flexible, spirally-wound, double-seamed metal tubing A, the soft-rubber tubular lining E therein, and the flanged ferrules F and F' respectively, seated in the opposite ends of the metal tubing A, and the flanged ferrules M and M' respectively, seated within the rubber lining at the opposite ends of the said tubing A, their flanges holding in place the folded projections of the rubber lining E; all constructed, combined and arranged as and for the purposes hereinbefore set forth.

20. The air-brake connection-hose consisting of the flexible, spirally-wound, double-seamed metal tubing A, the soft-rubber, tubular lining E therein, and the flanged ferrules M and M' respectively, seated within the rubber lining at the opposite ends of the said tubing A, their flanges holding in place the folded projections of the rubber lining E; all constructed, combined and arranged as and for the purposes hereinbefore set forth.

21. The air-brake connection-hose consisting of the flexible, spirally-wound, double-seamed metal tubing A, the soft-rubber, tubular lining E therein, and the flanged ferrules F and F' respectively, seated in the opposite ends of the metal tubing A; all constructed, combined and arranged as and for the purposes hereinbefore set forth.

22. The air-brake connection-hose consisting of the flexible, double-seamed, spirally-wound metal tubing A, combined with the soft-rubber, tubular lining E, whose ends are projected beyond the opposite extremities of the metal tubing and doubly folded over such extremities, and securely cemented thereto, leaving unobstructed the interior bore of such rubber-lined metal tubing; all constructed and combined as hereinbefore set forth.

23. In an air-brake connection, constructed of the flexible, double-seamed, spirally-wound metal tubing A, and the couplings D and B, each interiorly provided with the projections $c$ and $c'$, the improvement consisting of the rubber tubing E, lining the metal tubing A, and sealing with its folded ends $g$ and $g'$, the extremities of such metal tubing and packing the spaces between such extremities and the flat bearing-surfaces of the projections $c$ and $c'$, all as hereinbefore set forth.

24. In an air-brake connection the spirally-wound double-seamed metal tubing A, the soft-rubber tubular lining E therein, combined with the coupling-head B at one end and the air-pipe coupling C at the other end, these couplings being of usual construction except the nipple of each is exteriorly screw-threaded and interiorly furnished with an annular flat bearing-surface projection $c$, and screw-threaded therefrom to the mouth with threads to engage the outside slots between the folds of the tubing, the nuts D and D' and the gaskets G and G'; the flanges of the former, when such nuts are screwed on, compress the gaskets G and G' against the ends of the nipples and radially against the metal tubing, thereby aiding its retention in place, when screwed into the couplings B and C, the ferrules F and M and F' and M' and the gaskets H and H' which respectively with the folded ends of the rubber lining E and the flanges of such ferrules form the packing between the extremities of the metal tubing and the flat bearing-surfaces of the interior projections $c$, $c'$ of the couplings, and also the rubber-cloth covering K fastened with the wire binding L, all constructed and combined as hereinbefore described and shown.

25. As an improved lining-hose for spirally-wound metal tubing, the rubber hose $E^2$, furnished at each end with the flange $c$ to serve as a packing between the extremities of the metal tubing and the bearing-surfaces within the couplings into which the metal tube is to be inserted.

26. As an improved lining-hose for spirally-wound metal tubing, the rubber hose $E^3$, molded inside at each end with a thickness gradually increasing toward the mouth of the tube to serve as a packing between the extremities of the tubing and the bearing-surfaces within the couplings into which the metal tubing is to be inserted.

27. In an air-brake connection, the spirally-wound double-seamed metal tubing A, combined with the rubber tubular lining $E^2$, with the coupling-head B and the air-pipe coupling C respectively screwed upon the opposite ends of the metal tubing and being of usual construction, except the nipple of each is exteriorly screw-threaded and interiorly furnished with an annular projection $c$ and screw-threaded therefrom to the mouth with threads to engage the outside slots between the folds of the metal tubing, the nuts D and D' and the gaskets G and G'; the flanges of the former, when such nuts are screwed on, compress such gaskets against the ends of the nipples and radially against the metal tubing, thereby aiding its retention in place, when screwed into the couplings B and C, the flanges of the rubber tubing $E^2$ pack the interstices between the ends of the metal tubing and the bearing-surfaces of the projections $c\ c'$.

28. In an air-brake connection, the spirally-wound double-seamed metal tubing A, with the rubber tubular hose $E^3$, placed within or upon the outside of the tubing A or both within and upon the outside of the same, combined with the coupling-head B and the air-pipe coupling C, respectively screwed upon the opposite ends of the tubing, and being of usual construction except the nipple of each is exteriorly screw-threaded and interiorly furnished with annular projections $c\ c'$ respectively and screw-threaded therefrom to the mouth with threads to engage the outside slots between the folds of the tubing, the gaskets G and G' and the nuts D and D', the flanges of which squeeze the gaskets against the ends of the nipples and radially against the metal tubing, thereby aiding its retention in place, when screwed into the couplings B and C, the thickened extremities $x\ x$ of the tubing $E^3$ serving as a packing in the interstices between the extremities of the tubing A and the bearing-surfaces of the projections $c$ and $c'$ within the respective couplings.

Dated July 1, 1902.

SIGMUND FEUST.
BERTON L. WRIGHT.

Witnesses:
HOWARD G. BESTOR,
ELSIE M. AGARD.